United States Patent
Asada et al.

[11] Patent Number: 6,149,720
[45] Date of Patent: Nov. 21, 2000

[54] WATER-IN-OIL TYPE EMULSION INK FOR STENCIL PRINTING

[75] Inventors: Keisuke Asada; Yukitaka Watarai; Koji Ono; Yoshihiko Sato, all of Miyagi-ken, Japan

[73] Assignee: Tohoru Ricoh Co., Ltd., Japan

[21] Appl. No.: 09/505,681

[22] Filed: Feb. 17, 2000

[30] Foreign Application Priority Data

Jun. 3, 1999 [JP] Japan .................................. 11-156872
Dec. 3, 1999 [JP] Japan .................................. 11-345218

[51] Int. Cl.$^7$ .................................................. C09D 11/02
[52] U.S. Cl. ..................... 106/31.26; 106/31.41; 106/31.57; 106/31.73; 106/31.88
[58] Field of Search ............... 106/31.26, 31.41, 106/31.73, 31.57, 31.88

[56] References Cited

U.S. PATENT DOCUMENTS

| | | | |
|---|---|---|---|
| 5,573,578 | 11/1996 | Okuda ................................ | 106/31.26 |
| 5,622,548 | 4/1997 | Zou et al. ........................... | 106/31.26 |
| 5,667,570 | 9/1997 | Okuda et al. ...................... | 106/31.26 |
| 5,779,777 | 7/1998 | Okuda et al. ...................... | 106/31.26 |
| 5,800,599 | 9/1998 | Asada ................................. | 106/31.26 |
| 5,904,759 | 5/1999 | Okuda et al. ...................... | 106/21.26 |
| 5,948,151 | 9/1999 | Ono et al. .......................... | 106/31.26 |
| 5,981,625 | 11/1999 | Zou et al. ........................... | 523/161 |

FOREIGN PATENT DOCUMENTS

| | | |
|---|---|---|
| 6107998 | 4/1994 | Japan . |
| 8100142 | 4/1996 | Japan . |
| 931384 | 2/1997 | Japan . |
| 9268268 | 10/1997 | Japan . |
| 1180640 | 3/1999 | Japan . |

*Primary Examiner*—Helene Klemanski
*Attorney, Agent, or Firm*—Lorusso & Loud

[57] ABSTRACT

A water-in-oil type emulsion ink composed of 10–90% by weight of an oil phase and 90–10% by weight of an aqueous phase. The oil phase contains a petroleum solvent having a kinematic viscosity of greater than 6–10 mm$^2$/s at 40° C. and such a carbon content distribution that a naphthenic carbon content $C_N$ is at least 34%, an aromatic carbon content $C_A$ is 2–20% and a paraffinic carbon content CP is less than 55%.

7 Claims, No Drawings

WATER-IN-OIL TYPE EMULSION INK FOR STENCIL PRINTING

BACKGROUND OF THE INVENTION

This invention relates to an emulsion ink of a water-in-oil (w/o) type useful for stencil printing.

In stencil printing, an ink is applied onto a perforated stencil master backed by a printing paper and is passed through the perforations to form an image on the printing paper. Since a pattern of an emulsion ink printed on a paper is dried through evaporation and penetration thereof, fixation property of the ink is one of the very important aspect of the emulsion ink for stencil printing. It is also important that the ink should not be solidified before being applied onto a paper. It is also desired that the ink should no emit an unpleasant odor.

In necessitating saving of paper consumption, there is an increasing demand for a w/o type ink adapted for both sides printing. In both sides printing, a reverse side of a recording paper is printed after a front side has been printed. Thus, it is desired that the printed ink be quickly dried, since otherwise the ink is apt to transfer onto feed rolls of a printing machine to cause fouling of recording papers.

Known w/o type emulsion ink, however, is not satisfactory in these points.

For example, JP-A-6-107998 discloses a w/o type emulsion ink containing a liquid alkyd resin and a solvent containing a small aromatic compound content. This ink has a problem because the solvent is volatile in nature. Thus, when the printer containing the ink is maintained unused for a few months, the ink is dried to cause clogging of the screen.

JP-A-9-268268 and JP-A-9-31384 disclose a w/o type emulsion ink using a motor oil. The ink has a problem because the motor oil emits an unpleasant odor and because the viscosity of the motor oil significantly varies with the temperature.

SUMMARY OF THE INVENTION

It is, therefore, an object of the present invention to provide a w/o type emulsion ink which is suited for stencil printing and which can solve the above problems of the conventional inks.

Another object of the present invention is to provide a w/o type emulsion ink which does not emit an unpleasant odor, which does not solidify during storage in a printer and which does not foul feed rollers of both sides printing.

It is a further object of the present invention to provide a w/o type emulsion ink which has excellent fixation property when applied onto a paper and which gives uniform solid patterns.

In accomplishing the foregoing object, there is provided in accordance with the present invention a water-in-oil type emulsion ink comprising 10–90% by weight of an oil phase and 90–10% by weight of an aqueous phase, said oil phase containing a petroleum solvent having a kinematic viscosity of greater than 6–10 mm$^2$/s at 40° C. and such a carbon content distribution that a naphthenic carbon content $C_N$ is at least 34%, an aromatic carbon content $C_A$ is 2–20% and a paraffinic carbon content CP is less than 55%.

Other objects, features and advantages of the present invention will become apparent from the detailed description of the preferred embodiments to follow.

DETAILED DESCRIPTION OF THE PREFERRED EMBODIMENTS OF THE INVENTION

The w/o type emulsion ink according to the present invention comprises 10–90% by weight of an oil phase and 90–10% by weight of an aqueous phase. The oil phase contains a petroleum solvent having a kinematic viscosity of greater than 6–10 mm$^2$/s at 40° C. and such a carbon content distribution that a naphthenic carbon content $C_N$ is at least 34%, an aromatic carbon content $C_A$ is 2–20% and a paraffinic carbon content CP is less than 55%.

It is important that the petroleum solvent should have a kinematic viscosity of 6–10 mm 2/s at 40° C. in order to prevent fouling of recording paper by feed rollers in both sides printing while minimizing solidification of the ink during storage in printers.

It is also important that the petroleum solvent should have the above-mentioned carbon content distribution in order to obtain an ink which does not emit an unpleasant odor and which has good storage stability.

The carbon content distribution can be measured by the n-d-M method of structural group analysis (ring analysis) disclosed in Lubricant Handbook p. 344 (edited by Nippon Lubricant Oil Society, published by Youkendo). For example, an oil having $C_P$ of P%, $C_N$ of N% and $C_A$ of A% means that the percentage of the number of the paraffinic carbons thereof based on the total carbon number thereof is P% (P% Cp), that the percentage of the number of the naphthenic carbons thereof based on the total carbon number thereof is N% (N% $C_N$), and that the percentage of the number of the aromatic carbons thereof based on the total carbon number thereof is A% (A% $C_A$).

Illustrative of suitable petroleum solvents are those of Diana Fresia series such as G-6 and F-9 (Idemitsu Kosan Co., Ltd.). The petroleum solvent is preferably contained in the oil phase in an amount of 10–70% based on a total weight of oils in the oil phase. The oil phase may contain a mineral oil the oil having a kinematic viscosity of greater than 10.0 mm$^2$/s at 40° C. and such a carbon content distribution that a naphthenic carbon content $C_N$ is at least 34% and an aromatic carbon content $C_A$ is not greater than 20%.

Illustrative of suitable mineral oils having the above properties are Diana Process Oil NM-280, NR-68, NR-26, NP-24 and NS-90S (manufactured by Idemitsu Kosan Co., Ltd.), Diana Fresia N-28, N-90, N-150, U-46, U-56, U-68, U-130, U-170 and U-260 (manufactured by Idemitsu Kosan Co., Ltd.), Sunthene Oil 310, 410, 415, 420, 430, 450, 380, 480, 3125, 4130 and 4240 (manufactured by Japan Sun Co., Ltd.), and Gargoyle Arctic Oil 155, Gargoyle Arctic Oil 300ID, Gargoyle Arctic Oil Light and Gargoyle Arctic Oil C-Heavy (manufactured by Mobil Sekiyu Kabushiki Kaisha. These naphthenic mineral oils may be used singly or in combination of two or more thereof.

The oil phase may contain another type of a non-volatile mineral oil in addition to the above-described first type of the mineral oil. The second mineral oil has a viscosity of greater than 10.0 mm /s at 40° C. and such a carbon content distribution that a naphthenic carbon content $C_N$ is less than 34% and an aromatic carbon content $C_A$ is not greater than 20%. Illustrative of the second mineral oils are Nisseki Super Oils B, C, D, E (manufactured by Nippon Oil Co., Ltd.), Gargoyle Arctic 1010, 1022, 1032, 1046, 1068 and 1100 (manufactured by Mobil Sekiyu Kabushiki Kaisha), Mobil Vacuorin Extraheavy and Mobil DTE Extraheavy (manufactured by Mobil Sekiyu Kabushiki Kaisha), Sunpar Oil 110, 115, 120, 130, 150, 2100 and 2280 (manufactured by Japan Sun Co., Ltd.), Diana Process Oil PW-32, PW-90, PW-150, PS-32 and PS-90 (manufactured by Idemitsu Kosan Co., Ltd.) and Diana Fresia S-32, S-90, P-32, P-90, P-150, P-180 and P-430 (manufactured by Idemitsu Kosan Co., Ltd.). These oils may be used singly or in combination of two or more thereof.

It is preferred that the oil phase contain the mineral oil having a kinematic viscosity of greater than 10 mm²/s at 40° C. in an amount of 30–90% by weight, more preferably 40–70% by weight, based on a total oil content of the oil phase. Further, for reasons of safety, the oil phase preferably have less than 3% by weight of a content of polycyclic aromatic compounds including aromatic compounds having at least three condensed aromatic rings.

In addition to the mineral oils described above, the oil phase may contain one or more oils as long as the objects of the present invention are not adversely affected thereby. Illustrative of such oils are petroleum solvents having a kinematic viscosity of less than 6 m²/s at 40° C., liquid paraffins, spindle oils, machine oils, lubricant oils, other mineral oils, synthetic oils, vegetable oils (e.g. tall oil, linseed oil, corn oil, olive oil, rapeseed oil, castor oil, dehydrated castor oil, coconut oil and soybean oil) and aroma oils. Illustrative of suitable petroleum solvents are ISOPAR C, E, G, H, L and M (manufactured by Exxon Chemicals Co., Ltd.), EXXSOL D-30, D-40, D-80, D-110 and D-130 (manufactured by Exxon Chemicals Co., Ltd.), and AF Solvent #4, #5, #6 and #7 (manufactured by Nippon Oil Co., Ltd.). The content of the petroleum solvent is preferably at least 10% by weight but less than 40% by weight based on the total oil content of the oil phase.

The aroma oil may be as disclosed in JP-A-H1-80640 and have a mutagenicity index (MI) of less than 1.0, an aromatic carbon content (% $C_A$) of 20–55%, an aniline point of not higher than 100° C., a total polycyclic aromatics content of not greater than 50 ppm by weight based on a total oil content of the oil aroma oil and a content of individual polycyclic aromatic of not greater than 10 ppm by weight. The polycyclic aromatics may include benzo[a]anthracene, benzo[b]fluoranthene, benzo[j]fluoranthene, benzo[k]fluoranthene, benzo[a]pyrene and dibenzo[a, j]acridine.

In addition to the above oil components, the oil phase may contain an emulsifier, a resin, an oil-insoluble coloring agent, a dispersing agent for the coloring agent, a loading pigment, a gelation agent, an oxidation inhibitor and other conventional additives.

The emulsifier is used for the formation of a water-in-oil type emulsion. An anionic surfactant, a cationic surfactant, an amphoteric surfactant or a nonionic surfactant may be used as the emulsifier. Both high and low molecular weight emulsifier may be used. The emulsifier is preferably a nonionic surfactant such as a fatty acid ester of sorbitan (e.g. sorbitan monooleate, sorbitan sesquioleate, sorbitan trioleate or sorbitan monostearate), a fatty acid ester of polyoxyethylene-sorbitan (e.g. polyoxyethylenesorbitan monooleate or polyoxyethylenesorbitan trioleate),a mono-, di-, tri- or polyglyceride of a fatty acid (e.g. glyceryl monostearate, decaglyceryl trioleate or hexaglycerin polyricinoleate), a polyoxyethylenesorbitol fatty acid ester, a polyoxyethyleneglycerol fatty acid ester (e.g. a polyoxyethyleneglycerol plant oil fatty acid ester), an etylene oxide addition product of a fatty acid, a higher alcohol or alkylphenol (e.g. polyoxyethylene alkyl ether or polyoxyethylene alkylphenyl ether), a polyoxyethylenealkylamine fatty acid amide, a polyoxyethylene polyoxypropylene alkyl ether, polyoxyethylene castor oil, polyoxyethylene hydrogenated castor oil or a polyoxyethylene polyhydric alcohol ether. These surfactants may be used singly or in combination of two or more thereof. The emulsifier is used in an amount of 0.5–15% by weight, preferably 2–8% by weight, based on the weight of the ink.

Illustrative of suitable resins are rosin; rosin derivatives such as polymerized rosin, hydrogenated rosin, esterified rosin, hydrogenated and esterified rosin; rosin-modified resins such as rosin polyester resins, rosin-modified alkyd resins, rosin-modified maleic acid resins and rosin-modified phenol resins; maleic acid resins; phenol resins; petroleum resins; alkyd resins; rubber-derived resins such as cyclized rubbers; terpene resins; and polymerized castor oil. These resins may be used singly or as a mixture of two or more thereof. Rosin-modified phenol resins such as TAMANOL 353, TAMANOL 403, TAMANOL 361, TAMANOL 387, TAMANOL 340, TAMANOL 400, TAMANOL 396, TAMANOL 354, KG-836, KG-846, KG-1834 and KG-1801 (products of Arakawa Kagaku Kogyo Kabushiki Kaisha) are preferably used.

The resin preferably has a weight average molecular weight of 30,000–150,000, more preferably 55,000–150,000, for reasons of fixing property and printing property of the ink. It is also preferred that 1 g of the resin can be compatible with at least 1 g of Nisseki #0 Solvent H. The resin is preferably used in an amount of 2–50% by weight, more preferably 5–20% by weight, based on the weight of the oil phase. Too large an amount of the resin and too high a molecular weight of the resin would cause a problem of ink leakage, while a too small an amount and a too low a molecular weight of the resin would cause a problem in fixation of the ink.

The alkyd resin is constituted from a polybasic acid, a polyhydric alcohol and a fat or oil. Examples of the polybasic acids include phthalic anhydride, isophthalic acid, terephthalic acid, succinic acid, adipic acid, sebacic acid, tetrahydrophthalic acid, maleic acid, maleic anhydride, fumaric acid, itaconic acid and citraconic anhydride. Examples of polyhydric alcohols include ethylene glycol, diethylene glycol, triethylene glycol, polethylene glycol, propylene glycol, trimethylene glycol, tetramethylene glycol, glycerin, trimethylolpropane, neopentyl glycol, diglycerin, triglycerin, penthaerythritol, dipentaerythritol, mannitol and sorbitol. Examples of fats and oils include non-drying oil and semi-drying oil having an iodine value of 80 or less and fatty acids of these oils, such as coconut oil, palm oil, olive oil, castor oil, rice oil and cotton oil. Drying oil such as soybean oil, tung oil and linseed oil may also be used as long as the resulting alkyd resin has an iodine value of 80 or less.

The alkyd resin to be used as the relatively low molecular weight resin preferably has an oil length of 60–90 and a iodine value of 80 or less. The term "oil length" of the alkyd resin used herein is intended to refer to a percentage of the weight of the fatty acids contained in the fat and oil based on the weight of the alkyd resin when calculated in terms of triglycerides. The alkyd resin preferably has a molecular weight of 30,000 or less, more preferably 10,000 or less.

The coloring agent incorporated into the oil phase may be any known pigment or dispersing dye. An insoluble pigment or dye is preferably used. Examples of the coloring agents include carbon black such as acetylene black, channel black and furnace black; metal powder such as aluminum powder and bronze powder; inorganic pigments such as red oxide of iron, chrome yellow, ultramarine blue, chromium oxide and titanium oxide; azo pigments such as insoluble azo pigments, azo lake pigments and condensed azo pigments; phthalocyanin pigments such as metal-free phthalocyanin pigments and a copper phthalocyanin pigment; condensed polycyclic pigments such as anthraquinone pigments, quinacridone pigments, isoindolinone pigments, isoindolin pigments, dioxazine pigments, threne pigments, perylene pigments, perinone pigments, thioindigo pigments, quinophthalone pigments and metal complex pigments; organic pigments such as lake of acid or basic dyes; oil-soluble dyes such as diazo dyes and anthraquinone dyes; and fluorescent pigments. These pigments and dyes may be used singly or in combination of two or more thereof.

The fluorescent pigment suitably used for the purpose of the present invention is in the form of a synthetic resin matrix composited-type in which a fluorescent dye is supported by the resin matrix. The composite is prepared by dissolving the dye in a polymerization reaction solution or product, and then finely pulverizing the dye-bearing polymer. The polymer may be, for example, a melamine resin, a urea resin, a sulfonamide resin, an alkyd resin or a polyvinyl chloride resin.

The coloring agent is incorporated at least one of the oil phase and the aqueous phase. Thus, the above exemplified coloring agents may be also used for the incorporation into the aqueous phase. The pigment to be dispersed in the oil phase and/or aqueous phase preferably has an average particle size of 0.1–10 µm, more preferably 0.1–1 µm. The amount of the pigment is suitably determined according to the intended color density of the prints and is generally in an amount of 2–15% by weight based on the ink.

When carbon black is used as the pigment, acidic carbon black having a pH of less than 5 is preferably used for incorporation into the oil phase, while alkaline carbon black having a pH of 5 or more, more preferably 6–10, most preferably 7–9 is preferably used for incorporation into the aqueous phase. Examples of suitable carbon black pigments include Carbon Black MA-100, MA-77, MA-11, #40 and #44 (products of Mitsubishi Chemical Corporation) and Raven 1080, Raven 1255, Raven 760, Raven 410 and Raven 1100 (products of Columbian Carbon Japan Ltd.).

The dispersing agent for the pigment may be, for example, fatty acid esters of sorbitan (e.g. sorbitan sesquioleate), fatty acid esters of polyglycerin (e.g. hexaglycerin polyricinoleate), alkylamines having a high molecular weight, aluminum chelate compounds, styrene-maleic anhydride copolymers, high molecular weight polycarboxylic acid esters, aliphatic polycarboxylic acids, amine salts of polyesters, ester-type anionic surfactants, long chain amine salts of high molecular weight polycarboxylic acids, salts of long chain polyaminoamides with polyesters, polyamides, phosphoric acid ester surfactants, salts of alkylsulfocarboxylic acids, salts of a-olefinsulfonic acids, salts of dioctylsulfosuccinic acid, polyethylene imines, salts of alkylolamines and resins capable of dispersing the insoluble pigments such as alkyd resins. An anionic, cationic or amphoteric surfactant may also be used as the dispersing agent as long as it does not adversely affect the storage stability of the ink.

The above-described dispersing agents may be used singly or as a mixture of two or more. The dispersing agent is used in combination with the pigment and, thus, may be incorporated into the oil phase and/or aqueous phase. The dispersing agent which is not a resin or a polymer is used in an amount of 40% by weight or less, preferably 2–35% by weight, based on the weight of the pigment. A resin or a polymer dispersing agent such as an alkyd resin is used in an amount of at least 0.05 part by weight per part by weight of the pigment.

The loading pigment incorporated into the oil phase serves to control the viscosity of the ink and to prevent ink blurs. The loading pigment may be incorporated into the oil phase and/or aqueous phase. The loading pigments may be fine particles of inorganic materials such as clay, silica, talc, calcium carbonate, barium sulfate, titanium oxide, alumina, diatomaceous earth, kaolin, mica and aluminum hydroxide, or fine particles of organic materials such as polyacrylic ester, polyurethane, polyester, polyethylene, polypropylene, polyvinyl chloride, polyvinylidene chloride, polystyrene, polysiloxane, phenol resins, epoxy resins and copolymers thereof.

Illustrative of suitable loading pigments are Aerosil 200, Aerosil 972 (products of Nippon Aerosil Co., Ltd.), NEW D ORBEN (products of Shiroishi Kogyo Co., Ltd.), BENGEL, S-BEN, ORGANITE (products of Hojun Yoko Co., Ltd.), TIXOGEL VE, DS, GB, VG and EZ-100 and OPTIGEL (products of Nissan Girdler Catalyst Co., Ltd.). The loading pigment is used in an amount of 0.01–50% by weight, preferably 0.01–10% by weight, based on the ink.

The gelation agent serves to form a gel of the resin contained in the oil phase and to improve the storage stability, fixation property and fluidity of the ink. Thus, it is preferred that the gelation agent be capable of forming a coordinate bond with the resin contained in the oil phase. Illustrative of suitable gelation agents are organic acid salts, organic chelates or metal soap oligomers containing Li, Na, K, Al, Ca, Co, Fe, Mn, Mg, Pb, Zn or Zr. Specific examples of the gelation agent include metal salts of octylic acid such as aluminum octylate, metal salts of naphthenic acid such as manganese naphthenate, metal salts of stearic acid such as zinc stearate, and organic chelates such as aluminum diisopropoxide monoethylacetoacetate. These gelation agents may be used singly or as a mixture of two or more thereof and is generally used in an amount of not more than 15% by weight, preferably 5–10% by weight, based on the weight of the resin in the oil phase.

The oxidation inhibitor to be incorporated into the oil phase may be, for example, dibutylhydroxytoluene, propyl gallate and butylhydroxyanisole and is generally used in an amount of 2% by weight or less, preferably 0.1–1% by weight, based on the weight of the solvent. If desired, two or more oxidation inhibitors may be used in combination. The oxidation inhibitor serves to prevent the oxidation of binder resin to thereby prevent an increase of the viscosity of the ink.

If desired, a wax may be incorporated into the oil phase for the purpose of improving separation between a printing drum and printing paper or of preventing the sticking of printing paper.

The aqueous phase may contain water, an insoluble pigment, a dispersing agent for the pigment, a loading pigment, an electrolyte, a water-soluble polymer and an oil-in-water (o/w) type resin emulsion (hydrophobic polymer). An antifreezing agent, a mildew-proof agent (antiseptic agent), and a pH controlling agent may also be suitably incorporated into the aqueous phase.

The electrolyte serves as an emulsion stabilizer. A salt providing anions such as citrate ions, tartrate ions, sulfate ions and acetate ions, or a salt providing cations such as alkali metal ion and alkaline earth metal ions may be suitably used. Illustrative of suitable electrolytes are magnesium sulfate, sodium sulfate, sodium citrate, sodium hydrogenphosphate, sodium borate, aluminum sulfate and sodium acetate. These electrolytes may be used singly or in combination of two or more thereof. The electrolyte is generally used in an amount of 0.1–2% by weight, preferably 0.5–1.5% by weight, based on the weight of the aqueous phase.

The water-soluble polymer serves as a viscosity controlling agent, a wetting agent for the prevention of drying of the aqueous phase and a dispersing agent for pigments. Both natural and synthetic polymers may be used. Examples of water-soluble natural polymers include starch, mannan, sodium alginate, galactan, tragacanth rubber, gum Arabic, pullulan, dextran, xanthan rubber, gelatin, collagen, casein and glue. Examples of water-soluble synthetic polymers include carboxymethyl cellulose, methyl cellulose, hydroxyethyl cellulose, hydroxymethyl starch, carboxymethyl starch, dialdehyde-type starch, acrylic resins, sodium salt of polyacrylic acid, polyvinyl alcohol, polyvinyl pyrrolidone, polyacrylamide, poly-N-alkylsubstituted acrylamide, poly-N,N-dialkylsubstituted acrylamide, polyethylene oxide, polyvinyl methyl ether, styrene-maleic anhydride copolymer, styrene-acrylic acid copolymer and a polymer obtained by incorporating alkyl groups into the above copolymer for imparting hydrophobicity. Acrylamide polymers and acrylic polymers may be of a partly hydrophobic copolymer-type in which alkyl groups are incorporated into part of the monomer units. A block-copolymer of polyethylene and polypropylene or polybutylene may also be used. The above water-soluble polymers may be used singly or in combination with two or more thereof. A water-soluble polymer showing a surface tension of not greater than 65 mN/m when dissolved in water to have a concentration of 1 g/dL may be used. The amount of the water-soluble polymer is generally 25% by weight or less, preferably 0.5–15% by weight, based on the weight of the water contained in the ink.

The o/w type emulsion serves to improve drying property of the stencil ink and to function as a dispersing agent and contains a synthetic or natural polymer. The synthetic polymer may be, for example, polyvinyl acetate, polyvinyl chloride, polyacrylate, polymethacrylate, ethylene-vinyl acetate copolymer, vinyl acetate-acrylic ester copolymer, styrene-acrylic ester copolymer, vinylidene chloride-acrylic ester copolymer, vinylidene chloride-acrylic ester copolymer, vinyl chloride-vinyl acetate copolymer, vinyl chloride-vinyl acetate copolymer and polyurethane. The natural polymer as used in the oil phase may be used for the formation of the o/w type emulsion. Two or more different kinds of o/w type emulsions may be used, if desired. It is preferred that the o/w emulsion have a minimum film forming temperature of not higher than 40° C. The emulsion may be prepared in any known emulsifying method using a suitable dispersing agent, a protective colloid or a surfactant. Soap-free emulsion polymerization may also produce the o/w type emulsion. The o/w type emulsion is used in such an amount that the hydrophobic polymer is present in an amount of 2–50% by weight, preferably 3–20% by weight, based on the weight of the aqueous phase.

The mildew-proof agent is used for the prevention of growth of molds or germs in the ink during storage. It is recommendable to use the mildew-proof agent when the emulsion ink of the present invention is intended to be stored for a long period of time. Illustrative of suitable mildew-proof/antiseptic agent are aromatic hydroxyl compounds or their chlorinated derivatives such as salicylic acid, phenol compounds, p-oxybenzoate compounds such as methyl p-oxybenzoate and ethyl p-oxybenzoate, isothiazolin compounds, mixtures of triazine compounds with pyridine compounds, sorbic acid and dehydroacetic acid. These compounds may be used singly or in combination of two or more thereof. The mildew-proof agent is generally used in an amount of not greater than 3% by weight, preferably 0.1–1.2% by weight, based on the weight of the water in the ink.

The antifreezing agent which may also serve as a wetting agent may be, for example, glycols such as ethylene glycol, diethylene glycol and propylene glycol, lower alcohols such as methanol, ethanol, isopropanol, butanol and isobutanol, and polyhydric alcohols such as glycerin and sorbitol. These compounds may be used singly or in combination of two or more thereof. The amount of the antifreezing agent is generally not greater than 15% by weight, preferably 4–12% by weight, based on the weight of the water in the ink.

The pH controlling agent is used to maintain the pH of the ink at a suitable range of, for example, 6–8. Low molecular weight amines or alkanol amines such as diisopropanol amine, di-2(ethylhexyl)amine, triethanolamine, triamylamine, β-dimethylamino-propionitrile, dodecylamine and morpholine, and inorganic compounds such as sodium hydroxide, potassium hydroxide and sodium acetate are examples of the pH controlling agents. The pH-controlling agent, especially triethanolamine or sodium hydroxide, can serve to increase the viscosity of the ink by incorporation of the water-soluble polymer.

If desired, other conventional additives such as a preservative for the prevention of rust of a printer and an antifoaming agent may be incorporated into the aqueous phase in a suitable amount.

The w/o type emulsion ink according to the present invention may be prepared by any known method. For example, an oil phase in the form of an aqueous dispersion containing, for example, a pigment, an emulsifier, a resin and other additives is prepared at room temperature. An aqueous phase containing a water-soluble polymer, an electrolyte and other additives is then gradually mixed with the oil phase to form an emulsion.

The viscosity of the ink may be adjusted also by stirring conditions for the formation of the emulsion. It is desirable to adjust the viscosity of the ink to 3–40 Pa·s, more preferably 10–30 Pa·s, at a shear rate of 20 $s^{-1}$, though any viscosity may be adopted as long as the ink can meet with a given printing system. It is also desirable to adjust the viscosity of the oil phase to 0.01–20 Pa·s, more preferably 0.1–3 Pa·s, at a shear rate of 20 $s^{-1}$.

The following examples will further illustrate the present invention. Parts and percentages are by weight.

Mineral oils used in the following Examples and Comparative Examples have the properties shown in Table 1 below.

TABLE 1

| Oil | $C_A$ (%) | $C_N$ (%) | $C_p$ (%) | Kinematic Viscosity at 40° C. (mm²/s) |
|---|---|---|---|---|
| A1*1 | 8 | 49 | 43 | 6.5 |
| A2*2 | 11 | 54 | 35 | 9.4 |
| B1*3 | 10 | 43 | 47 | 19.9 |
| B2*4 | 13 | 43 | 44 | 143.2 |
| C1*5 | 7 | 30 | 63 | 21.4 |
| C2*6 | 0 | 33 | 67 | 31.0 |
| C3*7 | 35 | 36 | 29 | 12.7 |

*1: Diana Fresia G-6 (Idemitsu Kosan Co., Ltd.)
*2: Diana Fresia F-9 (Idemitsu Kosan Co., Ltd.)
*3: Sunthene Oil 310 (Japan Sun Oil Co., Ltd.)
*4: Sunthene Oil 480 (Japan Sun Oil Co., Ltd.)
*5: Gargoyle Arctic 1022 (Mobil Sekiyu Kabushiki Kaisha)
*6: Diana Process Oil PW-32 (Idemitsu Kosan Co., Ltd.)
*7: Diana Process Oil AC-12 (Idemitsu Kosan Co., Ltd.)

In the following Examples and Comparative Examples, an alkyd resin was used as a liquid resin. The alkyd resin was prepared from 76 parts of a coconut oil, 7 parts of pentaerythritol and 17 parts of isophthalic acid. As a volatile solvent, AF-5 Solvent (kinematic viscosity: 4.2 mm²/s at 40° C., naphthenic component: 76.8% by weight, aromatic compound content (according to JIS K2536): 0.2% by weight, product of Nippon Oil Co. Ltd.) was used. As a solid resin, a rosin polyester (Pencel PL, MW: 10,000) or a rosin-modified phenol resin (KG846, MW: 80,000) was used. These solid resins are products of Arakawa Kagaku Kogyo Co., Ltd. As carbon black, MA-77 (pH: 3.0, product of Mitsubishi Chemical Corporation) or Raven 760 (pH: 7.4, product of Columbian Carbon Japan Ltd.) was used. As a coloring agent, copper phthalocyanine blue (Lionol Blue FG-7330, product of Toyo Ink Inc.) was used. As a loading pigment, silica (Aerosil R972, product of Nippon Aerosil Inc.) was used. As a water-soluble polymer, sodium polyacrylate (Carbopol 940, product of BF Goodrich Company) or polyvinylpyrrolidone (K30, product of BASF) was used. As a dispersing agent for oil-insoluble coloring agent, an aluminum chelate (Plenact AL-M, product of Ajinomoto Inc.) was used. As an emulsifier, sorbitan sesquioleate (SO-15, product of Nikko Chemicals Inc.) was used.

EXAMPLE 1

A coloring agent, a petroleum solvent, a mineral oil and a dispersing agent as shown below were mixed and kneaded with three rolls. The resulting dispersion was mixed with a vanish containing an emulsifier as shown below to obtain an oil phase. An aqueous phase containing deionized water, an antifreezing agent, an antiseptic agent and an electrolyte as shown below was gradually added to the oil phase using an emulsifying device to obtain a w/o type emulsion ink having the composition shown below. The ink composition had a weight ratio of the oil phase to the aqueous phase of 26/74 and contained the pigment only in the oil phase. A content of the oil having a kinematic viscosity of 10 mm$^2$/s at 40° C. in the total oil content of the oil phase was 64% (10.5/16.5×100).

| Oil phase | |
| --- | --- |
| Coloring agent; carbon black (MA-77) | 4.5 parts |
| phthalocyanine blue | 0.5 part |
| Petroelum Solvent; A1 | 6.0 parts |
| Mineral oil; C2 | 10.5 parts |
| Dispersing agent; aluminum chelate | 0.5 part |
| Emulsifier; sorbitan sesquioleate | 4.0 parts |
| Aqueous phase | |
| Water; deionized water | 62.9 parts |
| Antifreezing agent; ethylene glycol | 10.0 parts |
| Electrolyte; magnesium sulfate | 1.0 part |
| Antiseptic agent; methyl p-oxybenzoate | 0.1 part |

EXAMPLE 2

Example 1 was repeated in the same manner as described above except that the petroleum solvent A1 (6.0 parts) was replaced by the petroleum solvent A2 (7.0 parts) and that the amount of the mineral oil C2 was reduced to 9.5 parts, thereby to obtain a w/o type emulsion ink having a weight ratio of the oil phase to the aqueous phase of 26/74 and containing the pigment only in the oil phase. A content of the oil having a kinematic viscosity of 10 mm$^2$/s at 40° C. in the total oil content of the oil phase was 58%.

EXAMPLE 3

Example 1 was repeated in the same manner as described above except that the amount of the petroleum solvent A1 (6.0 parts) was replaced by a mixture of 5.0 parts of the petroleum solvent A1 and 9.0 parts by weight of the petroleum solvent A2, the mineral oil C2 (10.5 parts) was not used at all and that water was used in an amount of 65.4 parts, thereby to obtain a w/o type emulsion ink having a weight ratio of the oil phase to the aqueous phase of 23.5/76.5 and containing the pigment only in the oil phase. A content of the oil having a kinematic viscosity of 10 mm$^2$/s at 40° C. in the total oil content of the oil phase was 0%.

EXAMPLE 4

Example 3 was repeated in the same manner as described above except that the amount of the petroleum solvent A1 was increased to 10.5 parts, that the petroleum solvent A2 was not used at all and that the mineral oil B1 (3.5 parts) was used, thereby to obtain a w/o type emulsion ink having a weight ratio of the oil phase to the aqueous phase of 23.5/76.5 and containing the pigment only in the oil phase. A content of the oil having a kinematic viscosity of 10 mm$^2$/s at 40° C. in the total oil content of the oil phase was 25%.

EXAMPLE 5

Example 1 was repeated in the same manner as described except that the petroleum solvent A1 (6.0 parts) was replaced by the petroleum solvent A2 (9.5 parts), that the mineral oil C2 (10.5 parts) was replaced by the mineral oil C1 (5.5 parts) and that water was used in an amount of 64.4 parts, thereby to obtain a w/o type emulsion ink having a weight ratio of the oil phase to the aqueous phase of 24.5/75.5 and containing the pigment only in the oil phase. A content of the oil having a kinematic viscosity of 10 mm$^2$/s at 40° C. in the total oil content of the oil phase was 37%.

EXAMPLE 6

Example 5 was repeated in the same manner as described except that the mineral oil C1 (5.5 parts) was replaced by the mineral oil B1 (5.5 parts), thereby to obtain a w/o type emulsion ink having a weight ratio of the oil phase to the aqueous phase of 24.5/74.5 and containing the pigment only in the oil phase. A content of the oil having a kinematic viscosity of 10 mm$^2$/s at 40° C. in the total oil content of the oil phase was 37%.

EXAMPLE 7

Example 6 was repeated in the same manner as described except that the amount of the petroleum solvent A2 was reduced to 5.0 parts, that the amount of the mineral oil B1 was increased to 10.5 parts and that water was used in an amount of 63.9 parts, thereby to obtain a w/o type emulsion ink having a weight ratio of the oil phase to the aqueous phase of 25/75 and containing the pigment only in the oil phase. A content of the oil having a kinematic viscosity of 10 mm$^2$/s at 40° C. in the total oil content of the oil phase was 68%.

EXAMPLE 8

Example 1 was repeated in the same manner as described to obtain a w/o type emulsion ink having the composition shown below. Solid and liquid resins and a volatile solvent were incorporated into the vanish. The composition had a weight ratio of the oil phase to the aqueous phase of 27/73 and contained the pigment only in the oil phase. A content of the oil having a kinematic viscosity of 10 mm$^2$/s at 40° C. in the total oil content of the oil phase was 40%.

| Oil phase | |
| --- | --- |
| Coloring agent; carbon black (MA-77) | 4.5 parts |
| phthalocyanine blue | 0.5 part |
| Solid resin; rosin-modified phenol | 2.0 parts |
| Liquid resin; alkyd resin | 0.5 part |
| Dispersing agent; aluminum chelate | 0.5 part |
| Volatile solvent; AF-5 Solvent | 3.0 parts |
| Petroleum solvent A1 | 6.0 parts |
| Mineral oil; B1 | 6.0 parts |
| Emulsifier; sorbitan sesquioleate | 4.0 parts |

-continued

| Aqueous phase | |
|---|---|
| Water; deionized water | 61.9 parts |
| Antifreezing agent; ethylene glycol | 10.0 parts |
| Electrolyte; magnesium sulfate | 1.0 part |
| Antiseptic agent; methyl p-oxybenzoate | 0.1 part |

EXAMPLE 9

Example 8 was repeated in the same manner as described except that rosin-modified phenol resin was substituted for the rosin polyester, an that the amounts of the petroleum solvent A1 and the mineral oil B1 were each decreased to 5.0 parts, thereby to obtain a w/o type emulsion ink containing the pigment only in the oil phase. A content of the oil having a kinematic viscosity of 10 mm$^2$/s at 40° C. in the total oil content of the oil phase was 38%.

EXAMPLE 10

Water, a pigment, a water-soluble polymer and an o/w type emulsion shown below were mixed with each other for 24 hours using a ball mill to obtain a dispersion, to which an antifreezing agent and an antiseptic agent shown below were mixed to obtain an aqueous phase. The aqueous phase was mixed with an oil phase containing a coloring agent, a loading pigment, a solid resin, a dispersing agent, a petroleum oil, a mineral oil and an emulsifier shown below using an emulsifying device to obtain a w/o type emulsion ink having the composition shown below. The ink composition had a weight ratio of the oil phase to the aqueous phase of 24/76 and containing the pigment in each of the oil phase and the aqueous phase. A content of the oil having a kinematic viscosity of 10 mm$^2$/s at 40° C. in the total oil content of the oil phase was 53%.

| Oil phase | |
|---|---|
| Coloring agent; carbon black (MA-77) | 1.0 part |
| Loading pigment; silica | 0.5 part |
| Solid resin; rosin-modified phenol resin | 1.0 part |
| Dispersing agent; aluminum chelate | 0.5 part |
| Petroleum solvent; A2 | 8.0 parts |
| Mineral oil; B1 | 9.0 parts |
| Emulsifier; sorbitan sesquioleate | 4.0 parts |
| Aqueous phase | |
| Water; deionized water | 54.9 parts |
| Coloring agent; carbon black (Raven 760) | 3.5 parts |
| Antifreezing agent; ethylene glycol | 10.0 parts |
| Water-soluble polymer; polyvinyl pyrrolidone | 2.5 parts |
| o/w Emulsion; polyacrylate (solid matter content: 50%) | 5.0 parts |
| Antiseptic agent; methyl p-oxybenzoate | 0.1 part |

EXAMPLE 11

Water, a pigment, a water-soluble polymer and an o/w type emulsion shown below were mixed with each other for 24 hours using a ball mill to obtain a dispersion, to which an antifreezing agent and an antiseptic agent shown below were mixed to obtain an aqueous phase. The aqueous phase was mixed with an oil phase containing a loading pigment, a petroleum oil, a mineral oil and an emulsifier shown below using an emulsifying device to obtain a w/o type emulsion ink having the composition shown below. The ink composition had a weight ratio of the oil phase to the aqueous phase of 22/78 and contained the pigment only in the aqueous phase. A content of the oil having a kinematic viscosity of 10 mm$^2$/s at 40° C. in the total oil content of the oil phase was 53%.

| Aqueous phase | |
|---|---|
| Water; deionized water | 55.9 parts |
| Coloring agent; carbon black (Raven 760) | 4.0 parts |
| Antifreezing agent; ethylene glycol | 10.0 parts |
| Water-soluble polymer; polyvinyl pyrrolidone | 3.0 parts |
| o/w Emulsion; polyacrylate (solid matter content: 50%) | 5.0 parts |
| Antiseptic agent; methyl p-oxybenzoate | 0.1 part |

COMPARATIVE EXAMPLE 1

Example 1 was repeated in the same manner as described except that the petroleum solvent A1 (6.0 parts) was replaced by the mineral oil B2 (4.0 parts), that the amount of the mineral oil C2 was increased to 16.5 parts and that the amount of water was reduced to 58.9 parts, thereby to obtain a w/o type emulsion ink having a weight ratio of the oil phase to the aqueous phase of 30/70 and containing the pigment only in the oil phase. A content of the oil having a kinematic viscosity of 10 mm$^2$/s at 40° C. in the total oil content of the oil phase was 100%.

COMPARATIVE EXAMPLE 2

Example 1 was repeated in the same manner as described above except that the petroleum solvent A1 (6.0 parts) was replaced by a mixture of 6.0 parts of a volatile solvent (AF-5) and 1.0 part of a liquid resin (alkyd resin), that the amount of the mineral oil C2 was reduced to 10.0 parts and that the amount of water was decreased to 62.4 parts, thereby to obtain a w/o type emulsion ink having a weight ratio of the oil phase to the aqueous phase of 26.5/73.5 and containing the pigment only in the oil phase. A content of the oil having a kinematic viscosity of 10 mm$^2$/s at 40° C. in the total oil content of he oil phase was 63%.

COMPARATIVE EXAMPLE 3

Example 1 was repeated in the same manner as described except that the petroleum solvent A1 (6.0 parts) was replaced by 12.0 parts of a volatile solvent (AF-5), that the mineral oil C2 was not used at all, that a loading pigment (1.0 part) was incorporated in the oil phase and that the amount of water was increased to 66.4 parts, thereby to obtain a w/o type emulsion ink having a weight ratio of the oil phase to the aqueous phase of 22.5/77.5 and containing the pigment only in the oil phase. A content of the oil having a kinematic viscosity of 10 mm$^2$/s at 40° C. in the total oil content of the oil phase was 0%.

COMPARATIVE EXAMPLE 4

Example 1 was repeated in the same manner as described except the petroleum solvent A1 (6.0 parts) was not used at all, that the mineral oil C2 (10.5 parts) was replaced by a mixture of 3.0 parts of the mineral oil B1, 5.0 parts of the mineral oil B2 and 11.0 parts of the mineral oil C3 and that the amount of water was decreased to 60.4 parts, thereby to obtain a w/o type emulsion ink having a weight ratio of the oil phase to the aqueous phase of 28.5/71.5 and containing the pigment only in the oil phase. A content of the oil having a kinematic viscosity of 10 mm$^2$/s at 40° C. in the total oil content of the oil phase was 100%.

Each of the above w/o type emulsion inks was tested for odor, fouling tendency, storage stability, drying tendency, fixation and uniformity of a solid pattern according to the following methods. The results are summarized in Tables 2-1 and 2-2.

Ink sample is charged in a commercially available stencil printer (Priport VT3920 manufactured by Ricoh Company, Ltd.) and the printing is repeatedly carried out so that the ink is fully distributed throughout the printer. The image density of prints is measured with a reflection type optical densitometer (RD914 manufactured by McBeath Inc.).

Odor:

An odor of an ink sample is evaluated by human olfactory sense and the evaluation is rated as follows:

A: odorless or almost no odor

B: significant odor

Fouling Tendency:

Printing is performed on both sides of a recording paper. The reverse side is printed 2 minutes after the completion of the front side printing. Fouling of the paper due to transference of the ink to feed rollers is evaluated on the basis of the following ratings:

A: no fouling

B: slight fouling

C: fair fouling

D: considerable fouling

Storage Stability:

An ink sample is stored in a closed container for 1 year at room temperature. A phase separation is then evaluated. The storage stability is scored on the basis of the following ratings:

score 5: no separation score 1: considerable separation

Drying Tendency:

An ink sample is applied on a glass plate with a bar coater. The ink coating is allowed to stand at room temperature. Evaluation of drying tendency is rated as follows:

A: ink is not dried within 6 months

B: ink is dried within 3–6 months

C: ink is dried within 1–3 months

D: ink is dried within 1 month

Fixation:

An image is rubbed with a rubber eraser to evaluate a difference in image density. The evaluation is rated as follows:

A: no difference

B: almost no difference

C: slight difference

D: fair difference

Uniformity of Solid Pattern:

A solid pattern is printed on a paper. The image is observed with a microscope. Evaluation of uniformity of solid pattern is rated as follows:

A: fibers of the paper are completely uniformly colored

B: fibers of the paper are not completely uniformly colored

TABLE 2-1

| | Example | | | | | | | |
|---|---|---|---|---|---|---|---|---|
| | 1 | 2 | 3 | 4 | 5 | 6 | 7 | 8 |
| Odor | A | A | A | A | A | A | A | A |
| Fouling Tendency | B | B | B | B | B | B | B | B |
| Storage Stability | 4 | 4 | 5 | 5 | 4 | 5 | 5 | 5 |

TABLE 2-1-continued

| | Example | | | | | | | |
|---|---|---|---|---|---|---|---|---|
| | 1 | 2 | 3 | 4 | 5 | 6 | 7 | 8 |
| Drying Tendency | A | A | C | B | A | A | A | A |
| Fixation | C | C | C | C | C | C | C | A |
| Uniformity of Solid Pattern | B | B | B | B | B | B | B | B |

TABLE 2-2

| | Example | | | Comparative Example | | | |
|---|---|---|---|---|---|---|---|
| | 9 | 10 | 11 | 1 | 2 | 3 | 4 |
| Odor | A | A | A | A | A | A | B |
| Fouling Tendency | B | B | A | D | B | B | C |
| Storage Stability | 5 | 5 | 5 | 3 | 3 | 4 | 5 |
| Drying Tendency | A | A | A | A | A | D | A |
| Fixation | B | C | C | C | C | C | C |
| Uniformity of Solid Pattern | B | A | B | B | B | B | B |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Applications No. H11-345218 filed Dec. 3, 1999, inclusive of the specification and claims, are hereby incorporated by reference herein.

What is claimed is:

1. A water-in-oil emulsion ink comprising 10–90% by weight of an oil phase and 90–10% by weight of an aqueous phase, said oil phase containing a petroleum solvent having a kinematic viscosity of greater than 6–10 mm$^2$/s at 40° C. and such a carbon content distribution that a naphthenic carbon content $C_N$ is at least 34%, an aromatic carbon content $C_A$ is 2–20% and a paraffinic carbon content CP is less than 55%.

2. A water-in-oil emulsion ink as claimed in claim 1, wherein said oil phase additionally contains a mineral oil having a kinematic viscosity of greater than 10.0 mm$^2$/s at 40° C.

3. A water-in-oil emulsion ink as claimed in claim 2, wherein said mineral oil is present in an amount of 30–90% by weight based on a total weight of oils in said oil phase.

4. A water-in-oil emulsion ink as claimed in claim 2, wherein said mineral oil has such a carbon content distribution that a naphthenic carbon content $C_N$ is at least 34% and an aromatic carbon content $C_A$ is not greater than 20%.

5. A water-in-oil emulsion ink as claimed in claim 1, wherein said oil phase additionally contains a resin selected from the group consisting of rosin-modified phenol resins, rosin polyester resins and alkyd resins.

6. A water-in-oil emulsion ink as claimed in claim 1, wherein said aqueous phase and said oil phase contain a water-insoluble coloring agent and an oil-insoluble coloring agent, respectively.

7. A water-in-oil emulsion ink as claimed in claim 1, wherein said aqueous phase contains a water-insoluble coloring agent.

* * * * *

UNITED STATES PATENT AND TRADEMARK OFFICE
CERTIFICATE OF CORRECTION

PATENT NO. : 6,149,720
DATED : November 21, 2000
INVENTOR(S) : Asada et al.

Page 1 of 1

It is certified that error appears in the above-identified patent and that said Letters Patent is hereby corrected as shown below:

Column 2,
Line 8, "mm 2/s" should read -- $mm^2/s$ --;
Line 24, "(P% Cp)" should read -- (P %$C_p$) --;
Line 26, "(N% $C_N$)" should read -- (N %$C_N$) --;
Line 28, "(A% $C_A$)" should read -- (A %$C_A$) --; and
Line 54, "mm /s" should read -- $mm^2/s$ --.

Signed and Sealed this

Fourth Day of December, 2001

*Attest:*

NICHOLAS P. GODICI
*Attesting Officer*   Acting Director of the United States Patent and Trademark Office

UNITED STATES PATENT AND TRADEMARK OFFICE
CERTIFICATE OF CORRECTION

PATENT NO. : 6,149,720  
DATED : November 21, 2000  
INVENTOR(S) : Keisuke Asada et al.

Page 1 of 1

It is certified that error appears in the above-identified patent and that said Letters Patent is hereby corrected as shown below:

<u>Title page,</u>
Add in line item [73]: Tohoku Ricoh Co. LTD., Miyagi-Ken (JP)

Signed and Sealed this

Twenty-fifth Day of December, 2001

*Attest:*

JAMES E. ROGAN
*Director of the United States Patent and Trademark Office*

*Attesting Officer*